United States Patent [19]

Tuss

[11] Patent Number: 4,507,868
[45] Date of Patent: Apr. 2, 1985

[54] COORDINATE MEASURING MACHINE WITH A SELF ALIGNING PNEUMATIC COUNTERBALANCE

[75] Inventor: John J. Tuss, Englewood, Ohio
[73] Assignee: The Warner & Swasey Company, Cleveland, Ohio
[21] Appl. No.: 413,099
[22] Filed: Aug. 30, 1982
[51] Int. Cl.$^3$ .............................................. G01B 5/20
[52] U.S. Cl. ................................. 33/1 M; 33/174 L; 33/DIG. 2
[58] Field of Search ................ 33/1 M, 174 R, 174 L, 33/DIG. 2, 147 N, 169 R, 174 P; 92/172; 188/322.22, 316

[56] References Cited

U.S. PATENT DOCUMENTS

| 2,710,137 | 6/1955 | Arnouil | 92/172 |
| 3,716,310 | 2/1973 | Guenther | 92/172 |
| 3,831,283 | 8/1974 | Pagella et al. | 33/174 R |
| 4,389,781 | 6/1983 | Donaldson | 33/1 M |

Primary Examiner—Willis Little
Attorney, Agent, or Firm—Howard G. Massung

[57] ABSTRACT

A coordinate measuring machine (10) having a vertically movable probe (41) supported from the bottom of a probe arm (42), the weight of which is offset by an improved pneumatic counterbalance (50). The pneumatic counterbalance is adapted to use a source of pressurized air acting upon a spherical piston (54) which is connected to probe arm (42). Spherical piston (54) fits with a close tolerance in cylinder (52). A rigid bracket (58) is connected to the top of probe arm (42). Piston rod (56) connects spherical piston (54) to a spherical bearing (53) in rigid bracket (58). A precision pressure regulator (70) having a relatively small capacity is provided to insure only a small change in the counterbalance force as the spherical piston (54) moves within cylinder (52). Regulator (70) is adjusted to provide make up air for the air which leaks past spherical piston (54).

6 Claims, 2 Drawing Figures

COORDINATE MEASURING MACHINE WITH A SELF ALIGNING PNEUMATIC COUNTERBALANCE

BACKGROUND OF THE INVENTION

1. Technical Field

This invention relates to coordinate measuring machines and more particularly to an improved and simplified pneumatic counterbalance for offsetting the weight of the vertical probe arm used on a coordinate measuring machine.

2. Background Art

Coordinate measuring machines are well known in the prior art. In a common type of coordinate measuring machine, which is used to make measurements of an article, a probe is mounted at the end of a vertically movable probe arm. The vertically movable probe arm is typically supported by a cartridge which is horizontally movable. Movement of the probe arm or carriage is accomplished in a manual type machine by an operator grasping the probe and physically moving it to the desired position, or, in a more sophisticated computer controlled machine, by a motor and a controller automatically positioning the probe.

In order to measure the article, the probe and carriage must be easily movable. Ideally, the probe, the carriage, and the related apparatus should be light weight. The vertically movable probe arm should be easily movable in response to desired positioning by an operator. However, the probe and the associated probe arm must not be movable freely or when no movement is desired.

It is also necessary that a coordinate measuring machine must be very accurate. Such accuracy is dependent upon low friction which in turn is related to the weight of the movable apparatus which is supported from the base of the coordinate measuring machine.

Several systems have been suggested to counterbalance the weight of the probe arm shaft assembly to prevent it from falling down and thereby possibly causing injury or damage. Prior art counterbalancing systems include mechanical counterbalances, pneumatic counterbalances and electrical counterbalances.

One method of accomplishing mechanical counterbalancing is to provide the probe shaft with an equivalent weight mounted to and offsetting the weight of the probe assembly. A disadvantage of such an arrangement is that the equivalent mechanical weight adds significantly to the friction and inertia in the system and makes it more difficult to move the probe and the carriage to accomplish the measurements on the article.

Another mechanical counterbalance approach, used in the prior art, couples the probe to a spring to provide an equivalent force directly opposite to the weight of the probe assembly. Unfortunately, springs are not available which exert a uniform force over a typical operating range of probe shaft movement, which is normally between 8 and 40 inches depending on the size of the machine. Further, the use of a spring counterbalance could result in friction which is greater than desired in some applications.

An electric counterbalance is disclosed in U.S. Pat. No. 3,818,596. In this patent, a counterbalance arrangement is disclosed which uses a variable torque magnetic particle clutch which has an output which is varied in accordance with the weight of the probe shaft.

Prior art counterbalances have typically had more friction than desired which makes it difficult to move the probe shaft. Further most prior art systems have characteristically been large and heavy, which have an unsatisfactory effect on the accuracy and repeatability of the coordinate measuring machine.

U.S. Pat. No. 4,207,680 which is herein incorporated by reference, discloses a pneumatic counterbalance system which has been found to operate satisfactorily.

DISCLOSURE OF THE INVENTION

The present invention teaches a coordinate measuring machine having a relatively simple pneumatic counterbalance system for counterbalancing the weight of the vertically movable probe arm assembly. The disclosed counterbalance, for the vertical probe arm of a coordinate measuring machine, allows considerable misalignment between the probe shaft and counterbalance cylinder or tube without producing forces that might influence probe shaft accuracy. Undesirable sticking and friction, usually associated with prior art pneumatic cylinder counterbalances is reduced to a bare minimum. The disclosed counterbalance system permits good accuracy and repeatability of measurements.

The disclosed counterbalance is a pneumatic spring formed from a piston and a cylinder tube arrangement. The counterbalance mechanism consists of a tube of an appropriate size with an accurately held internal diameter. The centerline of the tube does not require a high degree of straightness. Tube length is sufficient to accommodate probe shaft total movement. A piston assembly consisting of a precision ball secured to one end of a suitably sized piston rod is provided. The ball fits the internal diameter of the cylinder tube with a minimal diametrical clearance. The opposite end of the piston rod is retained in a spherical bearing mounted in a bracket which is connected directly to the probe arm shaft. A relatively small capacity precision adjustable air pressure regulator is disposed in the air supply line which is connected to the piston side of the cylindrical tube. The pressure regulator provides constant controllable air pressure. The regulator is adjusted to achieve the degree of counterbalance desired.

The spherical configuration at both ends of the piston rod permits free angular displacement of the rod during movement. If movement of the piston rod is held to easily achieved reasonable limits, angular displacement of the piston rod does not reduce probe shaft accuracy or repeatability.

The counterbalance cylinder is positioned as close as possible to the probe shaft to reduce the size of the support bracket which connects the probe shaft to the piston rod. The vertically movable probe shaft is supported by low friction bearings, such as air bearings, to permit easy movement.

BRIEF DESCRIPTION OF THE DRAWINGS

For a better understanding of the invention, reference may be had to the preferred embodiment exemplary thereof shown in the accompanying drawings wherein.

BEST MODE FOR CARRYING OUT THE INVENTION

Figure 1:
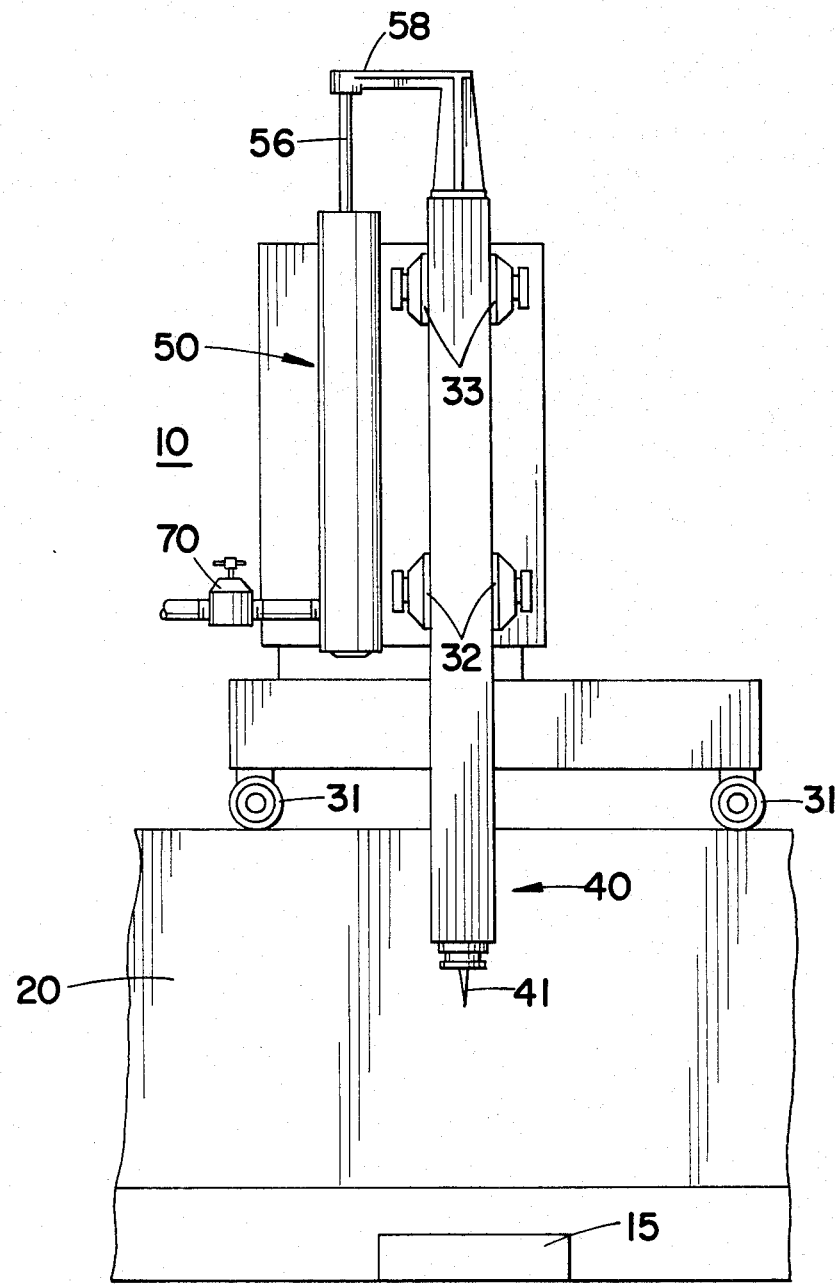
FIG. 1 is a view of a coordinate measuring machine constructed according to the teaching of the present invention; and, FIG. 2 is an enlarged section view showing the pneumatic counterbalance in more detail.

Referring now to the drawings, there is shown a coordinate measuring machine 10 using a pneumatic counterbalancing system 50 according to the present invention. Coordinate measuring machine 10 includes a base 20 and a horizontally movable carriage 30. Carriage 30 is mounted by bearings 31 to base 20. A vertically mounted probe assembly 40 is movably supported from carriage 30 by a lower set of air bearings 32 and an upper set of air bearings 33. The probe assembly 40 includes a probe tip 41 which engages an article 15 to be measured. Probe tip 41 is mounted on the end of a vertically movable probe arm 42.

The probe assembly 40 is adapted to be moved vertically either by an operator or an automatic control to inspect various portions of article 15. Probe tip 41 is instrumented in a manner well known in the art to provide an output indicative of the position to portions of article 15 at various points in time. The output can either be a display or other suitable record, which are not shown but both of which are well known in the art.

Figure 2:
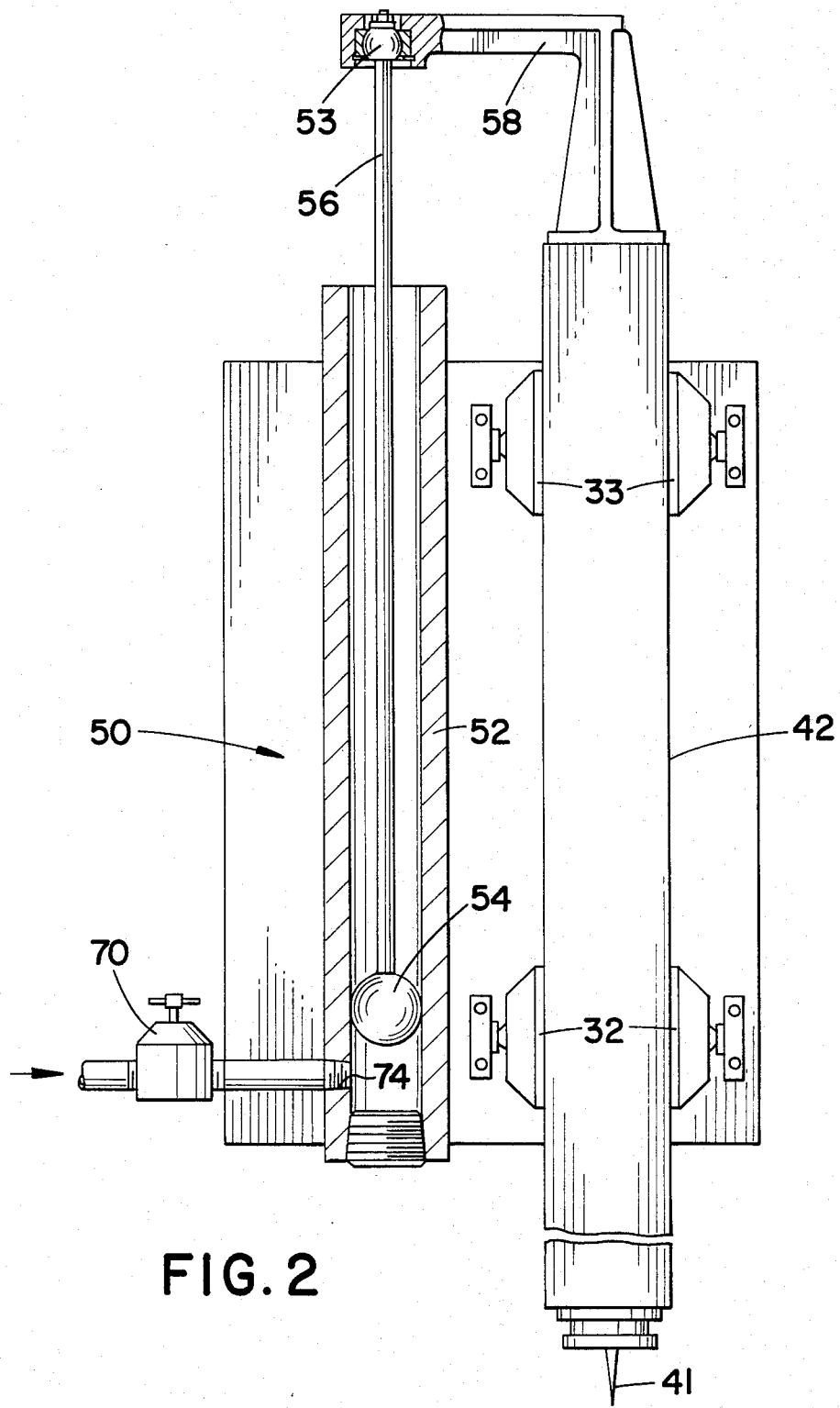

FIG. 2 illustrates in detail the pneumatic counterbalance system 50. A cylinder tube 52 has a precision spherical ball piston 54 disposed therein. The diametrical clearance between spherical ball piston 54 and the innerdiameter of cylindrical tube 52 is approximately 0.005 mm to 0.008 mm (0.0002 inches to 0.0003 inches). While it is important that the internal diameter of cylindrical tube 52 be accurate the straightness of the internal diameter is not critical.

A piston rod 56, fixed to spherical ball piston 54, extends from the open end of cylinder 52 and is connected by a ball joint 53 to a rigid bracket 58. Rigid bracket 58 is connected to and extends from the top of probe arm 42. Connecting the spherical piston 54 and rod 56 to rigid bracket 58 through ball joint 53 allows the piston rod 56 to be out of alignment with probe arm 42 and not bind or bend the probe arm during movement. This feature is important since binding or bending of the probe arm would reduce the accuracy of movement of the coordinate measuring machine 10. Ball piston 54, rod 56, bracket 58 and probe arm 42 are movable together as a unit. Use of a ball piston 54 is particularly advantageous since it can easily be placed in cylinder 52 and exact vertical alignment of rod 56 is not required.

Pressurized air is supplied to cylinder 52 from an air supply to counterbalance weight of the probe assembly so that its apparent weight is light. A precision adjustable air valve regulator 70 is disposed between the air pressure supply and an inlet 74 to cylinder tube 52. Air from the pressurized regulator 70 continually leaks past ball piston 54 and is vented to atmosphere. The air which leaks past piston 54 is made up by air from the pressure regulator valve 70. The spherical ball piston 54 has a relatively close fit in cylindrical tube 52 so the amount of make up air required is not large and the precision adjustable air pressure regulator 70 can be of a relatively small size.

The pressure in cylinder 52 is adjusted using adjustable regulator valve 70 to provide make up air to counterbalance most of the weight of probe assembly 40. The air flow through the adjustable variable flow regulator 70 is just sufficient to make up the air which leaks around piston 54. When probe arm 42 is moved piston 54 also moves changing the volume of pressurized air within cylinder 52 thus changing the pressure. As probe arm 42 is raised the pressure in cylinder 52 tends to drop but make up air, at the set pressure, is supplied by adjustable regulator 70. As probe arm 42 is lowered the pressure in cylinder 52 tends to rise, but pressure regulator 70 vents the excess air to atmosphere. A pressure regulator manufactured by BELLOFRAM Model No. 10-B has been found to be satisfactory for the disclosed application.

I claim:

1. In a coordinate measuring machine (10), including a base (20), a carriage (30) for movement relative thereto and a probe (41) disposed at the free end of a vertically extending probe arm (42) supported for vertical movement on said carriage for engaging features on an article to be measured, characterized by:
    a precision adjustable air pressure regulator (70) having an inlet adapted to be connected to a pressurized pneumatic supply and an outlet;
    a cylinder (52) mounted in said carriage alongside said probe and extending parallel thereto, said cylinder having an internal bore, with one closed end of said bore connected to the outlet of said precision adjustable air pressure regulator (70) and the other end of said bore vented to atmosphere;
    a spherical piston (54) disposed within the bore of said cylinder (52) for relative movement therein and sized to have a clearance therebetween to permit pressurized air to leak around said piston;
    an elongated piston rod (56) connected to said spherical piston (54) and extending within said cylinder;
    a rigid bracket (58) secured to said probe arm (42); and,
    a spherical bearing (53) connecting said rod (56) to said rigid bracket (58), whereby as said probe arm moves vertically, counterbalanced with pressurized air in said cylinder, misalignments between said cylinder and said probe shaft are accommodated by said spherical piston and bearing to eliminate forces otherwise acting on said probe arm as a result of said misalignments.

2. A coordinate measuring machine as claimed in claim 1 wherein:
    the clearance between said spherical piston (54) and the bore of said cylinder (52) is less than 0.0005 inches.

3. A coordinate measuring machine as claimed in claim 2 wherein:
    said probe arm (42) is supported by air bearing guides (32, 33) for low friction movement.

4. A coordinate measuring machine for measuring an article comprising:
    a base;
    a carriage mounted on said base for relative movement therealong;
    a probe for engaging the article to be measured;
    mounting means disposed on said carriage for supporting said probe thereon for vertical movement with respect to said carriage comprising:
        a vertically extending probe arm having said probe connected to one end thereof,
        a cylinder mounted on said carriage mounted alongside said probe arm to be generally parallel thereto and of a length sufficient to accommodate said movement of said probe on said carriage,
        said cylinder formed with an internal bore;

a spherical piston disposed in said cylinder bore for sliding movement therein with a clearance space therebetween, connecting means for connecting said piston to said probe arm for movement therewith while accommodating misalignments between said cylinder and said probe arm, an adjustable pressure regulator having an outlet connected to supply pressure regulated air beneath said spherical piston making up for leakage past said spherical piston through said clearance space while providing a counterbalancing force acting on said probe arm.

5. A coordinate measuring machine as claimed in claim 4 wherein said connecting means comprises:

a rigid bracket secured to said probe arm; and, an elongated rod connected at one end to said spherical piston and connected at the other end by a spherical bearing joint to said rigid bracket.

6. A coordinate measuring machine as claimed in claim 1 comprising:

air bearing guides supporting said probe arm for low friction movement.

* * * * *